United States Patent
Shieh

(10) Patent No.: US 9,294,868 B2
(45) Date of Patent: Mar. 22, 2016

(54) DEVICE, METHOD AND SYSTEM FOR COMMUNICATING DATA

(71) Applicant: Industrial Technology Research Institute, Hsinchu (TW)

(72) Inventor: Shin-Lin Shieh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 241 days.

(21) Appl. No.: 14/040,742

(22) Filed: Sep. 30, 2013

(65) Prior Publication Data

US 2014/0169272 A1    Jun. 19, 2014

Related U.S. Application Data

(60) Provisional application No. 61/736,553, filed on Dec. 13, 2012.

(51) Int. Cl.
*H04W 4/00* (2009.01)

(52) U.S. Cl.
CPC .............. *H04W 4/005* (2013.01); *H04W 4/006* (2013.01)

(58) Field of Classification Search
CPC ............................ H04W 4/005; H04W 4/006
See application file for complete search history.

(56) References Cited

U.S. PATENT DOCUMENTS

| | | | |
|---|---|---|---|
| 8,027,294 B2 | 9/2011 | Kim et al. | |
| 8,265,208 B2 | 9/2012 | Walton et al. | |
| 8,320,359 B2 | 11/2012 | Lindoff et al. | |
| 8,396,170 B2 | 3/2013 | Luo et al. | |
| 8,472,412 B2 | 6/2013 | Naka et al. | |
| 2004/0085946 A1 | 5/2004 | Morita et al. | |
| 2007/0140318 A1* | 6/2007 | Hellman | 375/130 |
| 2009/0219911 A1* | 9/2009 | Blankenship et al. | 370/345 |
| 2010/0220651 A1 | 9/2010 | Chen et al. | |
| 2011/0164707 A1 | 7/2011 | Luo et al. | |
| 2012/0020335 A1 | 1/2012 | Yellapantula et al. | |
| 2012/0099543 A1 | 4/2012 | Yang et al. | |

FOREIGN PATENT DOCUMENTS

| | | |
|---|---|---|
| CN | 101283564 | 10/2008 |
| CN | 102271023 | 1/2013 |

(Continued)

OTHER PUBLICATIONS

AD-HOC Chairman (NTT DOCOMO), "Summary of Low-cost MTC LTE UE Session," 3GPP TSG RAN WG1 Meeting #72b, Apr. 15-19, 2013, pp. 1-5.

(Continued)

*Primary Examiner* — Dang Ton
*Assistant Examiner* — Kevin Lee
(74) *Attorney, Agent, or Firm* — Jianq Chyun IP Office

(57) ABSTRACT

A device, method and system for communicating data are disclosed. The method for communicating data is adapted for a base station, and the method includes grouping a data for transmission in a plurality of data subsets, in which the data for transmission includes a plurality of information bits, encoding the data subsets; modulating the data subsets, and transmitting the data subsets to a receiving device. A base station includes a communication protocol module grouping a data for transmission in a plurality of data subsets, in which the data for transmission comprises a plurality of information bits, encoding the data subsets, modulating the data subsets, and transmitting the data subsets to a receiving device.

48 Claims, 5 Drawing Sheets

(56) References Cited

FOREIGN PATENT DOCUMENTS

| TW | 200910817 | 3/2009 |
|---|---|---|
| TW | 201218674 | 5/2012 |
| WO | 2013077235 | 5/2013 |
| WO | 2013108049 | 7/2013 |

OTHER PUBLICATIONS

Itri, "Decoding Technique of PBCH for Low-cost MTC Devices," 3GPP TSG RAN WG1 Meeting 73, May 20-24, 2013, pp. 1-4.

3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.4.0, Dec. 2011, pp. 1-296.

Huawei, HiSilicon, "Text proposal for PBCH coverage improvement for MTC," 3GPP TSG RAN WG1 Meeting 72, Apr. 15-19, 2013, pp. 1-2.

Vodafone, Alcatel-Lucent, "Updated SID on: Provision of low-cost MTC UEs based on LTE," TSG RAN Meeting 57, Sep. 4-7, 2012, pp. 1-6.

3GPP Organizational Partners, "3rd Generation Partnership Project; Technical Specification Group Radio Access Network; Study on provision of low-cost MTC UEs based on LTE; (Release 11)," 3GPP TR 36.888, Jun. 2012, pp. 1-43.

Samsung, "Coverage improvement techniques for low-cost MTC UEs," 3GPP TSG RAN WG1 #72b, Jan. 18- Feb. 1, 2013, pp. 1-2.

Sierra Wireless, "PBCH Correlation Decoder for MTC Coverage Improvement," 3GPP TSG RAN WG1 #72b, Apr. 15-19, 2013, pp. 1-5.

Nokia Siemens Networks and Nokia, "PBCH Coverage Improvement Performance Results for MTC," 3GPP TSG RAN1 #72b, Apr. 15-19, 2013, pp. 1-3.

Huawei and Hisilicon, "Further analysis and evaluation for PBCH coverage improvement for MTC," 3GPP TSG RAN WG1 Meeting #72b, Apr. 15-19, 2013, pp. 1-6.

CATT, "PBCH coverage improvement for low-cost MTC UEs," 3GPP TSG RAN WG1 Meeting #72b, Apr. 15-19, 2013, pp. 1-4.

Samsung et al., "Proposed way forward on RAN1-led WIDs/SIDs to start," 3GPP TSG RAN #60, Jun. 11-14, 2013, pp. 1.

Vodafone, "New WI: Low cost & enhanced coverage MTC UE for LTE," 3GPP TSG RAN Meeting #60, Jun. 10-14, 2013, pp. 1-5.

"Office Action of Taiwan Counterpart Application", issued on Jan. 22, 2015, p. 1-p. 4.

\* cited by examiner

DEVICE, METHOD AND SYSTEM FOR COMMUNICATING DATA

CROSS-REFERENCE TO RELATED APPLICATION

This application claims the priority benefit of U.S. provisional application Ser. No. 61/736,553, filed on Dec. 13, 2012. The entirety of the above-mentioned patent application is hereby incorporated by reference herein and made a part of this specification.

TECHNICAL FIELD

The technical field relates to a device, method and system for communicating data.

BACKGROUND

As LTE technology is being gradually developed, operators would like to reduce the cost of overall network maintenance by minimizing the number of radio access technologies. Machine-Type Communications (MTC) devices are targeting low-end (low cost, low data rate) applications that can be handled adequately by GSM/GPRS. As more and more MTC devices are deployed in the field, operators rely on the existing GSM/GPRS network for the low-cost MTC devices. With these low-cost MTC GSM/GPRS devices and with the existing GSM/GPRS network, operators will be able to reap the maximum benefit out of their spectrum. In cellular systems, essential information about the cellular network are often carried in broadcast channels, and communicating data over broadcast channels having sufficient coverage is an indispensable element of the cellular system.

SUMMARY

The disclosure provides a method for communicating data, adapted for a base station, the method including grouping a data for transmission in a plurality of data subsets, in which the data for transmission includes a plurality of information bits; encoding the data subsets; modulating the data subsets; and transmitting the data subsets to a receiving device.

The disclosure provides a base station, including a communication protocol module grouping a data for transmission in a plurality of data subsets, in which the data for transmission includes a plurality of information bits, encoding the data subsets, modulating the data subsets, and transmitting the data subsets to a receiving device.

The disclosure provides a wireless communication system, including a plurality of base stations and a plurality of receiving devices, in which at least one of the plurality of base stations includes a communication protocol module grouping a data for transmission in a plurality of data subsets, in which the data for transmission includes a plurality of information bits, encoding the data subsets, modulating the data subsets, and transmitting the data subsets to at least one of the plurality of receiving devices.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
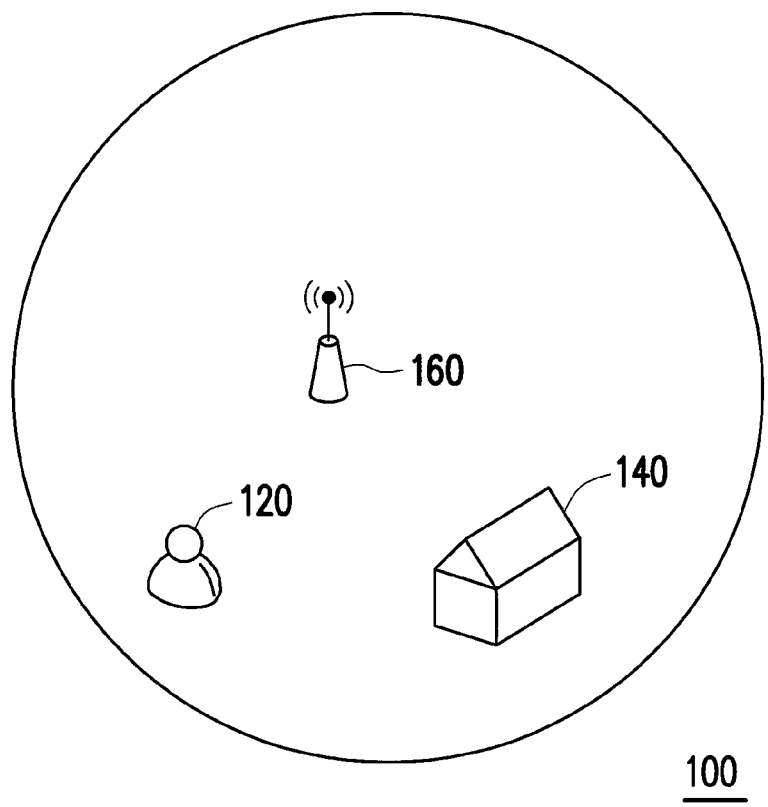
FIG. 1 is a schematic view of an example system implementing a method for communicating data in a wireless network according to an exemplary embodiment.

FIG. 1 is a schematic view of an example system implementing a method for communicating data in a wireless network according to an exemplary embodiment. With reference to FIG. 1, a system 100 includes communication devices 120 and 140 and one or more intermediate devices 160.

Figure 2:
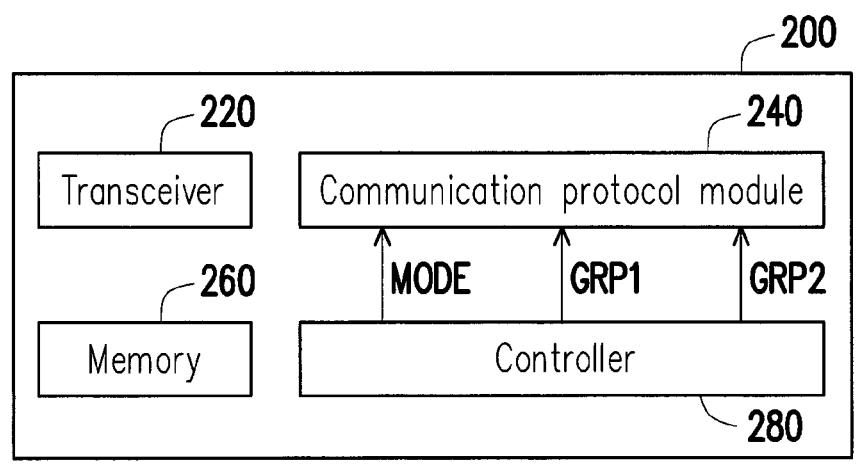
FIG. 2 is a functional block diagram of a device in the system depicted in FIG. 1 according to an exemplary embodiment.

FIG. 2 is a functional block diagram of a device in the system depicted in FIG. 1 according to an exemplary embodiment. In FIG. 2, a device 200 may represent the communication devices 120 and 140 and the one or more intermediate devices 160 shown in FIG. 1. The device 200 may include a transceiver 220, a communication protocol module 240, a memory 260, and a controller 280. The transceiver 220, the memory 260, and the controller 280 may be connected to the communication protocol module 240. The transceiver 220 may be configured to transmit and receive signals from other devices within the coverage range thereof. The transceiver 220 may perform analog-to-digital signal conversion (ADC), digital-to-analog signal conversion (DAC), modulation, demodulation, signal amplification, low-pass filtering, and bandpass filtering. The transceiver 220 is, for example, configured to provide information of a received signal to the communication protocol module 240, modulate data received from the communication protocol module 240 into a modulated signal, and transmit the modulated signal to other devices in the system 100. The controller 280 may provide parameters such as a mode parameter MODE, a first grouping parameter GRP1, and a second grouping parameter GRP2 to the communication protocol module 240.

The communication protocol module 240 may be configured for receiving a reception quality information of another device in the system 100 through the controller 280, and the reception quality information may be obtained from the first grouping parameter GRP1 and the second grouping parameter GRP2, or other parameters in the device 200. In addition, the communication protocol module 240 may also be configured for receiving a coverage target determined by a base station in the system 100, for example, and the coverage target may be obtained from the first grouping parameter GRP1 and the second grouping parameter GRP2, or other parameters in the device 200. Moreover, the communication protocol module 240 may process commands according to the parameters provided by the controller 280 (or executing corresponding operations according to parameters). The communication protocol module 240 may include a processor (not drawn) and an embedded software or firmware program. The embedded software or firmware program may include program codes of a communication protocol stack. When the processor of the communication protocol module 240 executes the program codes of the communication protocol stack, the communication protocol module 240 may be configured for executing various procedures in a method for communicating data, which will be described in detail in the embodiments below accompanied by FIGS. 3-6. In addition, the memory 260 may be configured for temporarily storing parameters or other data used in the procedures. The device 200 may further include other components (not shown), such as an antenna module to accomplish the aforementioned functions of the transceiver 220, the communication protocol module 240, the memory 260, and the controller 280. Other components may also be included in the communication devices 120 and 140 and the one or more intermediate devices 160 in accordance with the wireless network implementation of the system 100, such as CDMA, WCDMA, GSM, UMTS, 3G, 4G, WiMAX, LTE, or other suitable implementations.

The communication devices 120 and 140 and the one or more intermediate devices 160 depicted in FIG. 1 may be a user equipment (UE), a mobile station (MS), an advanced mobile station (AMS), a wireless terminal communication device, a machine-to-machine (M2M) device, or a machine-type communications (MTC) device. Moreover, the devices may also be a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor. These devices may be located in a office building or in a residence. For example, the communication device 140 depicted in FIG. 1 may be a smart electric meter installed in a basement of an apartment complex. Furthermore, the one or more intermediate devices 160 may be base stations (BS), advanced base stations, node B systems, or evolved node Bs (eNBs), for example.

Figure 3:
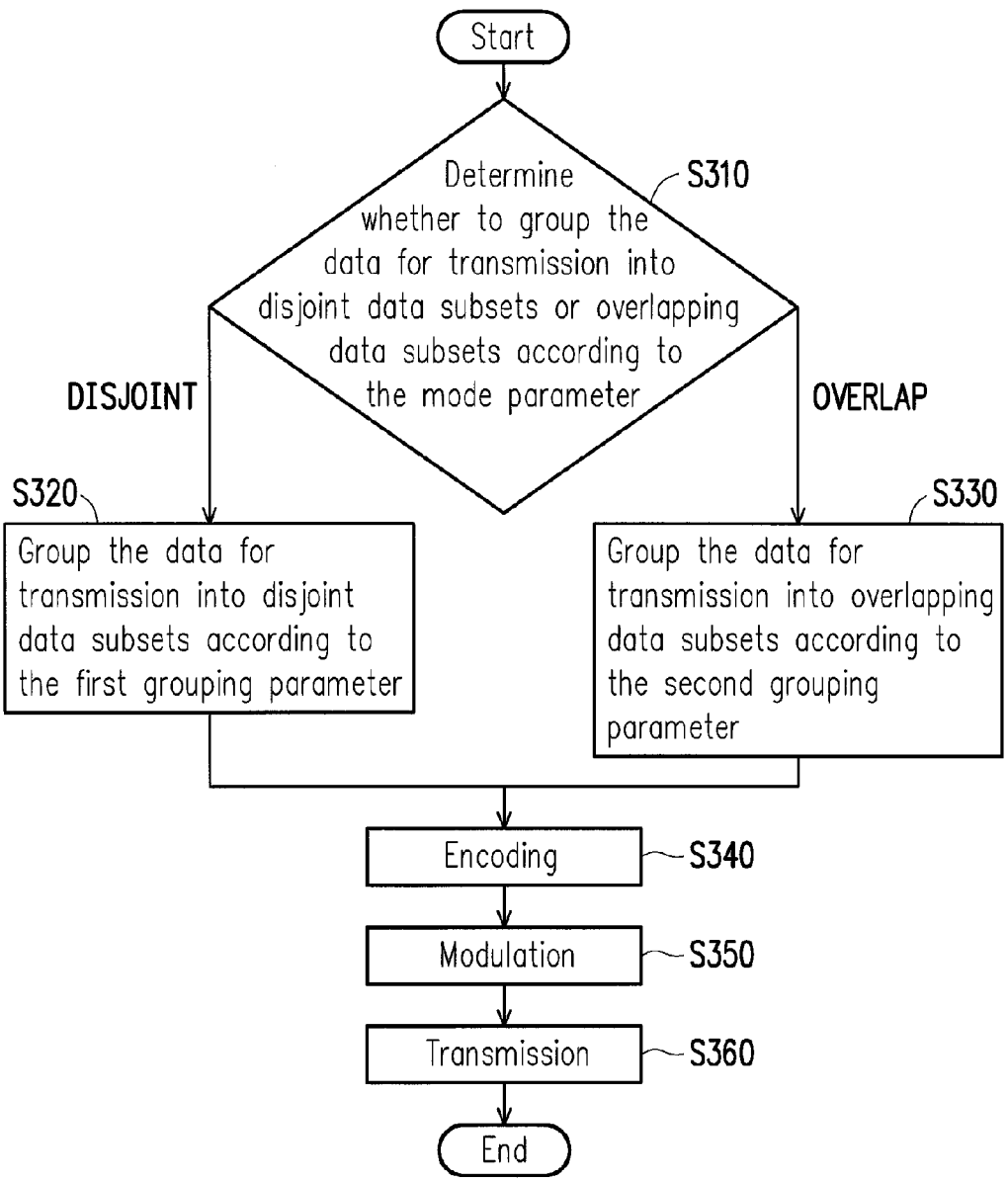
FIG. 3 is a flow diagram of a method for communicating data adapted for a base station according to an exemplary embodiment.

FIG. 3 is a flow diagram of a method for communicating data adapted for a base station according to an exemplary embodiment. With reference to FIGS. 1 and 3, the method depicted in FIG. 3 may be executed by the intermediate device 160 serving as a base station (referred to as base station 160 hereafter) for establishing a communication link with the communication device 120 and 140 in the present embodiment. In the method, the communication protocol module 240 of the base station 160 is configured for grouping a data for transmission in a plurality of data subsets, in which the data for transmission includes a plurality of information bits, encoding the data subsets, modulating the data subsets, and transmitting the data subsets to a receiving device such as the communication devices 120 and 140 depicted in FIG. 1.

In detail, the method depicted in FIG. 3 may include the following steps. The communication protocol module 240 may group the data for transmission into the plurality of data subsets by determining whether to group the data for transmission into disjoint data subsets or overlapping data subsets according to the mode parameter MODE from the controller 280 in the base station 160 (Step S310). When the mode parameter indicates grouping by disjoint data subsets, the process proceeds to Step S320, and the communication protocol module 240 is configured to group the data for transmission into a plurality of disjoint data subsets according to the first grouping parameter GRP1. On the other hand, when the mode parameter MODE indicates grouping by overlapping data subsets, the process proceeds to Step S330, and the communication protocol module 240 is configured to group the data for transmission into a plurality of overlapping data subsets according to the second grouping parameter GRP2.

Before proceeding to an encoding process of Step S340, the communication protocol module may further process the disjoint and the overlapping data subsets. In some embodiments, when the data for transmission is grouped into disjoint data subsets, each of the disjoint data subsets is interleaved with a plurality of information bits unknown to the communication device 140. Each of the interleaved disjoint data subsets may further comprise a plurality of consecutive information bits known to the communication device 140. In other embodiments, the first grouping parameter GRP1 may include a reception quality information reported by the communication device 140, for example. Moreover, the communication protocol module 240 may determine the number of disjoint data subsets to be transmitted to the communication device 140 according to the reception quality information in the first grouping parameter GRP1. In some embodiments, the first grouping parameter GRP1 may also include a coverage target determined by the base station 160, and the communication protocol module 240 may determine the number of disjoint data subsets to be transmitted to the communication device 140 according to the coverage target in the first grouping parameter GRP1.

In some embodiments, when the data for transmission is grouped into overlapping data subsets, each of the overlapping data subsets is interleaved with a plurality of information bits unknown to the communication device 140. Each of the interleaved overlapping data subsets may further comprise a plurality of consecutive information bits known to the communication device 140. In other embodiments, the second grouping parameter GRP2 may include a reception quality information reported by the communication device 140, for example. Moreover, the communication protocol module 240 may determine the number of overlapping data subsets to be transmitted to the communication device 140 according to the reception quality information in the second grouping parameter GRP2. In some embodiments, the second grouping parameter GRP2 may also include a coverage target determined by the base station 160, and the communication protocol module 240 may determine the number of overlapping data subsets to be transmitted to the communication device 140 according to the coverage target in the second grouping parameter GRP2.

After group the data for transmission into the plurality of disjoint data subsets or overlapping data subsets, the encoding process in Step S340 is performed. In some embodiments, the encoding process implemented by the communication protocol module 240 may include a CRC attachment process, a channel coding process, a rate matching process, and a scrambling process. In one example of a physical broadcast channel (PBCH) transmission of master information block (MIB) information bits in a LTE implementation, the CRC attachment process may add 16 parity bits, the channel coding process may include tail-biting convolutional coding with 1/3 code rate polynomial, the rate matching may be repeated 16 times for a robust transmission, and the scrambling process is included to mitigate inter-cell interference. After the encoding process of Step S340, the data subsets are modulated in Step S350. In the aforementioned example, the data subsets are modulated in QPSK for low error rate, for example. After modulation, Step S360 is performed for transmission. In the aforementioned example, the transmission step may include layer mapping, precoding, resource mapping, and OFDM generation, for example, in which the layer mapping and precoding adopt SFBC for MIMO transmission.

A receiving device such as the communication devices 120 and 140 may estimate the information transmitted by the base station 160 in a process that essentially reverses the method depicted in FIG. 3. In the aforementioned example, information that is transmitted such as a MIB information may be estimated by configuring the communication protocol module of the communication devices 120 and 140 to disassemble the constellation symbols of a received signal, and further de-precode, de-layer map, de-modulate, de-scramble, de-rate-match, perform tail-biting convolutional decoding, and execute a CRC check on the received signal. In another example, the tail-biting convolutional decoding and CRC check processes may be combined into a maximum-likelihood decoding process which decodes each data subsets and a legacy data to achieve performance gain.

Figure 4:
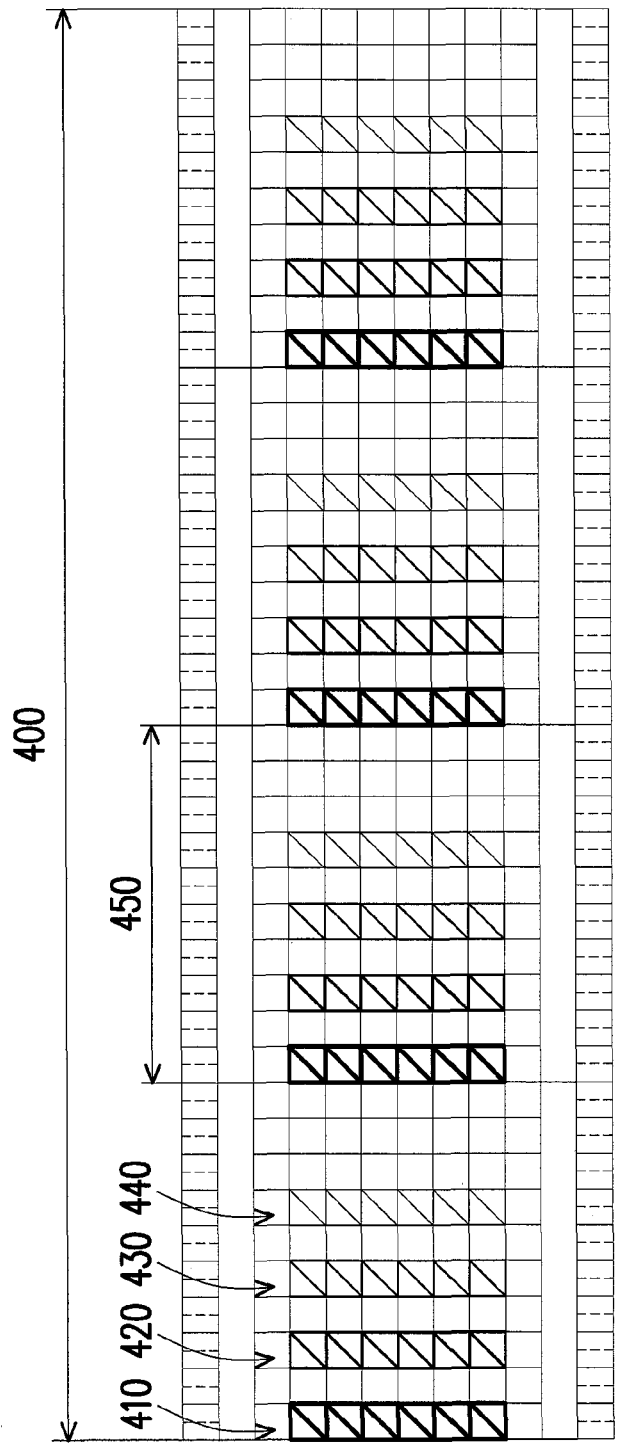
FIG. 4 is a schematic view of a transmission time interval of a data transmitted by a method for communicating data according to an exemplary embodiment.

To further illustrate the method for communicating data executed by the base station 160, FIG. 4 provides a schematic view of a transmission time interval of a data transmitted by a method for communicating data according to an exemplary embodiment. To facilitate description, an example of the base station 160 transmitting master information block (MIB) bits is provided. In the present embodiment, the MIB bits are transmitted over a transmission time interval 400 of 40 ms with four radio subframes 450 of 10 ms, as shown in FIG. 4. In each subframe 450, the base station 160 may first transmit a legacy data 410 of MIB bits which are not processed by the method for communicating data depicted in FIG. 3. In the present embodiment, the legacy data 410 may include three downlink system bandwidth information bits, three Physical Hybrid ARQ Indicator Channel (PHICH) configuration information bits, eight system frame number information bits, and ten spare bits, with a total of 24 MIB bits. After the transmission of the legacy data 410, the grouped data subsets 420, 430, and 440 are transmitted, although the disclosure is not limited to three data subsets. The data subsets 420-440 may be grouped and transmitted by the method for communicating data shown in FIG. 3, for example. In this example, the fact that some information in the 24 MIB bits of the legacy data 410 are known by the receiving device in advance is exploited for the grouping of the data subsets 420-440. For example, the ten spare bits of the 24 MIB bits are set to zero, and the downlink bandwidth and PHICH configuration bits seldom change. Accordingly, time diversity and antenna diversity may be exploited when only a predetermined amount of bits U unknown to the receiving device are included in each of the data subsets 420-440. When there are U unknown bits, then only $2^U$ codewords are possible after channel encoding in the encoding step of S340 in FIG. 3. The $2^U$ codewords may be generated in the receiving device by passing $2^U$ possible MIB information through the CRC encoder and the channel encoder. Moreover, the receiving device such as the communication devices 120 and 140 may blindly detect the number of antenna ports and combine up to four consecutive transmissions in the 40 ms time transmission interval 400. In the present embodiment, each of the legacy data 410 and the data subsets 420-440 include six resource blocks, for example, as indicated by each of the boxes having a diagonal line. The number of times each of the data subsets 420-440 is transmitted to the receiving device may be different for each of the data subsets 420-440. In one example, the data subset 420 may be transmitted once, the data subset 430 may be transmitted twice, and the data subset 440 may be transmitted four times, although other embodiments of the disclosure are not limited thereto, and other repetition patterns are possible according to the application.

Figure 5A:
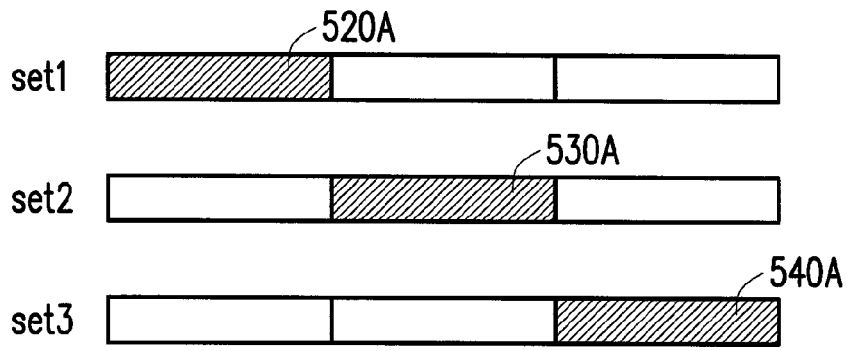
FIGS. 5A-5C are schematic views of three arrangements of disjoint data subsets according to an exemplary embodiment.
Figure 5B:
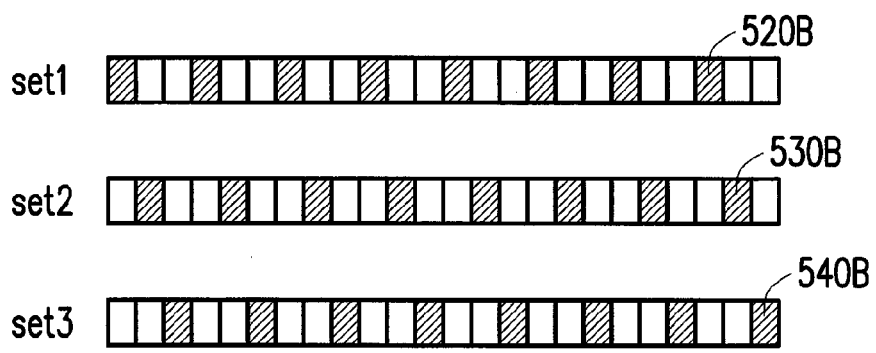
Figure 5C:
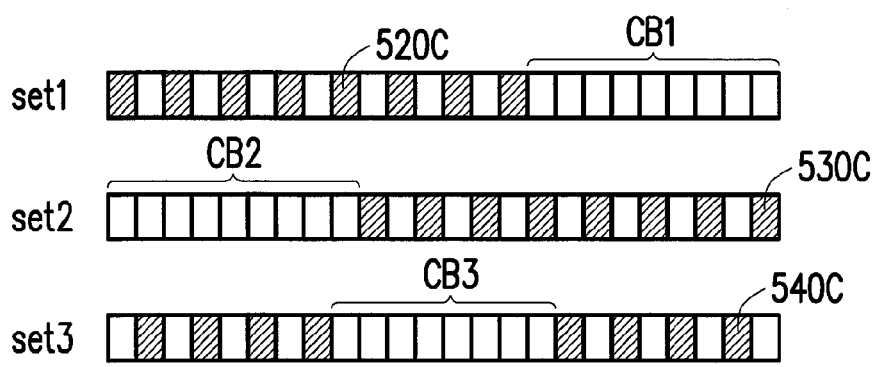

In FIGS. 5A-5C and FIG. 6, additional possible arrangements of the information bits in the data subsets are provided to further illustrate the method for communicating data depicted in FIG. 3. FIGS. 5A-5C are schematic views of three arrangements of disjoint data subsets according to an exemplary embodiment. In FIG. 5A, a data for transmission is grouped into three disjoint sets of set1 520A, set2 530A, and set3 540A. Set1 520A may include eight unknown bits b1-b8, set2 530A may include unknown bits b9-b16, and set3 540A may include unknown bits b17-b24, in which the other bits in the data subsets 520A-540A may be information bits known to a receiving device such as the communication device 140 in FIG. 1. The number of unknown bits in each of the data subsets 520A-540A are not limited to the number in the current example, and other arrangements of the disjoint data subsets 520A-540A are possible in view of the available system resources and the input data for transmission, which may be information provided by the parameters from the controller 280 in FIG. 2. For example, FIGS. 5B and 5C illustrate that the unknown bits of the disjoint data subsets 520A-540A in FIG. 5A may be interleaved. In FIG. 5B, the unknown bits in the data subsets set1 520B, set2 530B, and set3 540B are interleaved, and this arrangement may provide additional decoding performance for the receiving device because the begin state of the tail-biting trellis is known to the receiving device. In FIG. 5C, the unknown bits in the data subsets set1 520C, set2 530C, and set3 540C are interleaved. Additionally, each of the data subsets 520C-540C include a plurality of consecutive bits known to the receiving device. For example, set1 520C may include a plurality of consecutive bits CB1 forming the end of the data stream, set2 530C may include a plurality of consecutive bits CB2 forming the beginning of the data stream, and set3 540C may include a plurality of consecutive bits CB3 forming the middle of the data stream, although the disclosure is not limited thereto. By including consecutive bits in each of the data subsets 520C-540C, the receiving device may achieve preferable decoding performance due to the known states in the tail-biting trellis.

Figure 6:
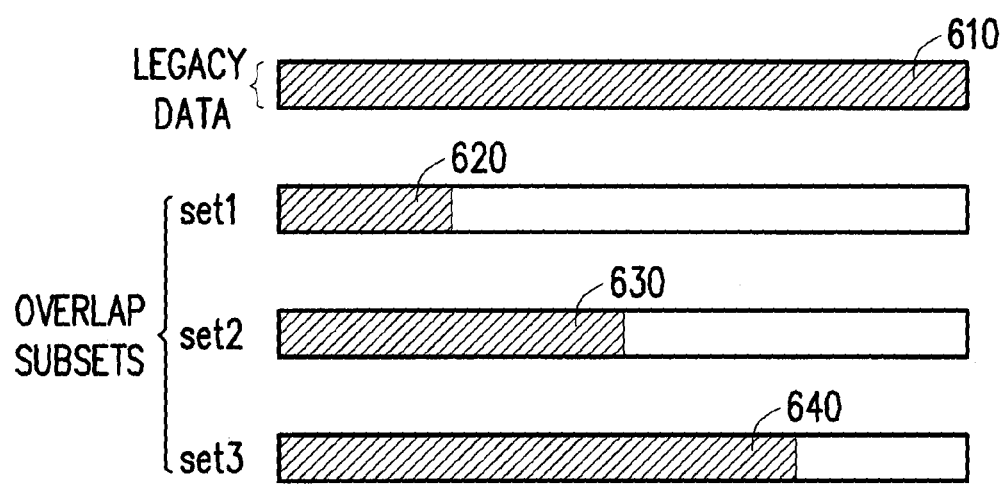
FIG. 6 is a schematic view of an arrangement of overlapping data subsets according to an exemplary embodiment.

FIG. 6 is a schematic view of an arrangement of overlapping data subsets according to an exemplary embodiment. With reference to FIG. 6, in an example for transmitting MIB information bits, a legacy data 610 may include 24 information bits. The overlapping data subsets set1 620, set2 630, and set3 640 may be grouped by the method for communicating data shown in FIG. 3, such that set1 620 includes unknown bits b1-b6, set2 630 include unknown bits b1-b12, and set3 640 include unknown bits b1-b18, with overlapping unknown bits in the data subsets 620-640. However, the disclosure is not limited to this arrangement of overlapping unknown bits in the data subsets, and other arrangements are possible, such as an arrangement with a different amount of overlapping unknown bits, for example. Moreover, in some embodiments, the number of overlapping data subsets 620-640 transmitted to the communication device 140 from the base station 160 may be determined by the reception quality information of the second grouping parameter GRP2 depicted in FIG. 2, which may include information previously reported by the communication device 140 to the base station 160. In one example, when the second grouping parameter GRP2 indicates the communication device 140 has good reception quality, the base station 160 may transmit only the legacy data 610 to the communication device 140, since the communication device 140 may save power by needing to decode only once. When the second grouping parameter GRP2 indicates the communication device 140 has medium reception quality, the base station 160 may first transmit set2 630 and then transmit the legacy data 610 to the communication device 140. Accordingly, the communication device 140 may first decode the unknown bits b1-b12 from set2 630, and then decode bits b13-b24 from the legacy data 610. Moreover, when the second grouping parameter GRP2 indicates the communication device 140 has poor reception quality, the base station 160 may first transmit the overlapping data subsets set1 620, set2 630, and set3 640, and then transmit the legacy data 610 to the communication device 140. The communication device 140 would first decode the unknown bits b1-b6 from set1 620, then decode the unknown bits b7-b12 from set2 630, the unknown bits b13-b18 from set3 640, and then bits b19-b24 from the legacy data 610. The number of overlapping data subsets 620-640 transmitted to the communication device 140 from the base station 160 may also be determined by the coverage target of the second grouping parameter GRP2 depicted in FIG. 2. Furthermore, that the transmission of different sequences of the data subsets in FIGS. 5A-5C in accordance with the reception quality information may also be applied to the disjoint data subsets shown in FIGS. 5A-5C, or applied to other possible arrangements not shown.

By utilizing the methods and devices for communicating data described above, a wireless communication system such as the system 100 depicted in FIG. 1 may be obtained. The wireless communication system may include a plurality of base stations (e.g. the base station 160) and a plurality of receiving devices (e.g. the communication devices 120 and 140). At least one of the plurality of base stations includes a communication protocol module, in which the communication protocol module groups a data for transmission in a plurality of data subsets, in which the data for transmission includes a plurality of information bits, encodes the data subsets, modulates the data subsets, and transmits the data subsets to at least one of the plurality of receiving devices. Further details of the wireless communication system may be obtained in reference to the description of the methods and devices for communicating data and FIGS. 2-6, and therefore further elaboration thereof is omitted hereafter.

In view of the foregoing, by adopting the methods for communicating data described in the exemplary embodiments, base stations, communication devices and wireless communication systems may achieve preferable transmission and decoding performance along with increased coverage. Moreover, the overall complexity of the decoders in the receiving communication devices may be reduced as a result of the data grouping and transmission by the base stations.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for communicating data, adapted for a base station, the method comprising:
grouping a data for transmission in a plurality of data subsets of master information block (MIB), wherein the data for transmission comprises a plurality of information bits, and determining whether to group the data for transmission into disjoint data subsets or overlapping data subsets according to a mode parameter from a controller in the base station;
encoding the data subsets;
modulating the data subsets; and
transmitting the data subsets to a receiving device.

2. The method of claim 1, wherein the step of grouping the data for transmission into the plurality of data subsets comprises:
when the mode parameter indicates grouping by disjoint data subsets, grouping the data for transmission into a plurality of disjoint data subsets according to a first grouping parameter.

3. The method of claim 2, wherein each of the disjoint data subsets is interleaved with a plurality of information bits unknown to the receiving device.

4. The method of claim 3, wherein each of the interleaved disjoint data subsets comprises a plurality of consecutive information bits known to the receiving device.

5. The method of claim 2, wherein the first grouping parameter comprises a reception quality information reported by the receiving device.

6. The method of claim 2, wherein the first grouping parameter comprises a coverage target determined by the base station.

7. The method of claim 5, wherein the number of disjoint data subsets transmitted to the receiving device is determined by the reception quality information in the first grouping parameter.

8. The method of claim 6, wherein the number of disjoint data subsets transmitted to the receiving device is determined by the coverage target n the first grouping parameter.

9. The method of claim 1, wherein the step of grouping the data for transmission into the plurality of data subsets comprises:
when the mode parameter indicates grouping by overlapping data subsets, grouping the data for transmission into a plurality of overlapping data subsets according to a second grouping parameter.

10. The method of claim 9, wherein the overlapping data subsets are interleaved with a plurality of information bits unknown to the receiving device.

11. The method of claim 10, wherein each of the interleaved overlapping data subsets comprises a plurality of consecutive bits known to the receiving device.

12. The method of claim 9, wherein the second grouping parameter comprises a reception quality information reported by the receiving device.

13. The method of claim 9, wherein the second grouping parameter comprises a coverage target determined by the base station.

14. The method of claim 12, wherein the number of overlapping data subsets transmitted to the receiving device is determined by the reception quality information in the second grouping parameter.

15. The method of claim 13, wherein the number of overlapping data subsets transmitted to the receiving device is determined by the coverage target in the second grouping parameter.

16. The method of claim 1, wherein a number of times each of the data subsets is transmitted to the receiving device is different for each of the data subsets.

17. A base station, comprising:
a communication protocol module grouping a data for transmission in a plurality of data subsets of master information block (MIB), wherein the data for transmission comprises a plurality of information bits, encoding the data subsets, modulating the data subsets, and transmitting the data subsets to a receiving device,.
wherein the communication protocol module groups the data for transmission into the plurality of data subsets by determining whether to group the data for transmission into disjoint data subsets or overlapping data subsets according to a mode parameter from a controller in the base station.

18. The base station of claim 17, wherein when the mode parameter indicates grouping by disjoint data subsets, the communication protocol module is configured to group the data for transmission into a plurality of disjoint data subsets according to a first grouping parameter.

19. The base station of claim 18, wherein each of the disjoint data subsets is interleaved with a plurality of information bits unknown to the receiving device.

20. The base station of claim 19, wherein each of the interleaved disjoint data subsets comprises a plurality of consecutive information bits known to the receiving device.

21. The base station of claim 18, wherein the first grouping parameter comprises a reception quality information reported by the receiving device.

22. The base station of claim 18, wherein the first grouping parameter comprises a coverage target determined by the base station.

23. The base station of claim 21, wherein the number of disjoint data subsets transmitted to the receiving device is determined by the reception quality information in the first grouping parameter.

24. The base station of claim 22, wherein the number of disjoint data subsets transmitted to the receiving device is determined by the coverage target in the first grouping parameter.

25. The base station of claim 17, wherein when the mode parameter indicates grouping by overlapping data subsets, the communication protocol module is configured to group the data for transmission into a plurality of overlapping data subsets according to a second grouping parameter.

26. The base station of claim 25, wherein the overlapping data subsets are interleaved with a plurality of information bits unknown to the receiving device.

27. The base station of claim 26, wherein each of the interleaved overlapping data subsets comprises a plurality of consecutive bits known to the receiving device.

28. The base station of claim 25, wherein the second grouping parameter comprises a reception quality information reported by the receiving device.

29. The base station of claim 25, wherein the second grouping parameter comprises a coverage target determined by the base station.

30. The base station of claim 28, wherein the number of overlapping data subsets transmitted to the receiving device is determined by the reception quality information in the second grouping parameter.

31. The base station of claim 29, wherein the number of overlapping data subsets transmitted to the receiving device is determined by the coverage target in the second grouping parameter.

32. The base station of claim 17, wherein a number of times each of the data subsets is transmitted to the receiving device is different for each of the data subsets.

33. A wireless communication system comprising a plurality of base stations and a plurality of receiving devices, wherein at least one of the plurality of base stations comprises:
   a communication protocol module grouping a data for transmission in a plurality of data subsets, wherein the data for transmission comprises a plurality of information bits, encoding the data subsets of master information block (MIB), modulating the data subsets, and transmitting the data subsets to at least one of the plurality of receiving devices,
   wherein the communication protocol module groups the data for transmission into the plurality of data subsets by determining whether to group the data for transmission into disjoint data subsets or overlapping data subsets according to a mode parameter from a controller in the base station.

34. The wireless communication system of claim 33, wherein when the mode parameter indicates grouping by disjoint data subsets, the communication protocol module is configured to group the data for transmission into a plurality of disjoint data subsets according to a first grouping parameter.

35. The wireless communication system of claim 34, wherein each of the disjoint data subsets is interleaved with a plurality of information bits unknown to the at least one receiving device.

36. The wireless communication system of claim 35, wherein each of the interleaved disjoint data subsets comprises a plurality of consecutive information bits known to the at least one receiving device.

37. The wireless communication system of claim 34, wherein the first grouping parameter comprises a reception quality information reported by the at least one receiving device.

38. The wireless communication system of claim 34, wherein the first grouping parameter comprises a coverage target determined by the at least one base station.

39. The wireless communication system of claim 37, wherein the number of disjoint data subsets transmitted to the receiving device is determined by the reception quality information in the first grouping parameter.

40. The wireless communication system of claim 38, wherein the number of disjoint data subsets transmitted to the receiving device is determined by the coverage target in the first grouping parameter.

41. The wireless communication system of claim 33, wherein when the mode parameter indicates grouping by overlapping data subsets, the communication protocol module is configured to group the data for transmission into a plurality of overlapping data subsets according to a second grouping parameter.

42. The wireless communication system of claim 41, wherein the overlapping data subsets are interleaved with a plurality of information bits unknown to the at least one receiving device.

43. The wireless communication system of claim 42, wherein each of the interleaved overlapping data subsets comprises a plurality of consecutive bits known to the at least one receiving device.

44. The wireless communication system of claim 41, wherein the second grouping parameter comprises a reception quality information reported by the at least one receiving device.

45. The wireless communication system of claim 41, wherein the second grouping parameter comprises a coverage target determined by the at least one base station.

46. The wireless communication system of claim 44, wherein the number of overlapping data subsets transmitted to the at least one receiving device is determined by the reception quality information in the second grouping parameter.

47. The wireless communication system of claim 45, wherein the number of overlapping data subsets transmitted to the at least one receiving device is determined by the coverage target in the second grouping parameter.

48. The wireless communication system of claim 33, wherein a number of times each of the data subsets is transmitted to the receiving device is different for each of the data subsets.

* * * * *